US010625551B2

(12) United States Patent
Rumpel et al.

(10) Patent No.: US 10,625,551 B2
(45) Date of Patent: Apr. 21, 2020

(54) ELASTIC CHASSIS LINK FOR A VEHICLE

(71) Applicant: SCHAEFFLER TECHNOLOGIES AG & CO. KG, Herzogenaurach (DE)

(72) Inventors: Peter Rumpel, Werneck/Schraudenbach (DE); Hartmut Krehmer, Erlangen (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 45 days.

(21) Appl. No.: 15/740,505

(22) PCT Filed: Jun. 15, 2016

(86) PCT No.: PCT/DE2016/200274
§ 371 (c)(1),
(2) Date: Dec. 28, 2017

(87) PCT Pub. No.: WO2017/016553
PCT Pub. Date: Feb. 2, 2017

(65) Prior Publication Data
US 2018/0194184 A1 Jul. 12, 2018

(30) Foreign Application Priority Data

Jul. 30, 2015 (DE) .................. 10 2015 214 460

(51) Int. Cl.
B60G 7/00 (2006.01)
(52) U.S. Cl.
CPC ........ B60G 7/003 (2013.01); B60G 2202/442 (2013.01); B60G 2204/4193 (2013.01);
(Continued)

(58) Field of Classification Search
CPC ............... B60G 7/003; B60G 2500/22; B60G 2500/104; B60G 2206/1116;
(Continued)

(56) References Cited

U.S. PATENT DOCUMENTS 2,252,771 A 8/1941 Katcher
3,896,908 A * 7/1975 Petrak .................... B60G 17/08
188/280

(Continued)

FOREIGN PATENT DOCUMENTS

AU 1659097 A 11/1997
AU 199716590 B2 9/1999
(Continued)

OTHER PUBLICATIONS

International Search Report for International Application No. PCT/DE2016/200274 dated Oct. 6, 2016.

Primary Examiner — Drew J Brown
(74) Attorney, Agent, or Firm — Brooks Kushman P.C.

(57) ABSTRACT

An elastic chassis link for a vehicle is disclosed. The elastic chassis link includes a sliding joint having first and second sliding joint rods. The joint rods are movable axially relative to each other in order to change the rigidity of the elastic chassis link. The first sliding joint rod is connected to a piston that is arranged axially and movable axially within a piston space within second sliding joint rod. The piston divides the piston space into two chambers that interact with a damping element, such as fluid, within each chamber.

20 Claims, 1 Drawing Sheet

(52) U.S. Cl.
CPC .. *B60G 2204/62* (2013.01); *B60G 2206/1116* (2013.01); *B60G 2206/73* (2013.01); *B60G 2500/104* (2013.01); *B60G 2500/22* (2013.01)

(58) Field of Classification Search
CPC .......... B60G 2202/442; B60G 2204/62; B60G 2204/4193; B60G 2206/73
See application file for complete search history.

(56) References Cited

U.S. PATENT DOCUMENTS

| | | | | |
|---|---|---|---|---|
| 4,396,098 | A * | 8/1983 | Petrak | F16F 9/512 188/280 |
| 4,973,077 | A * | 11/1990 | Kuwayama | B60G 21/0553 188/318 |
| 6,276,693 | B1 * | 8/2001 | Oakley | B60G 17/0162 280/5.506 |
| 7,984,915 | B2 * | 7/2011 | Post, II | F16F 9/466 280/124.128 |
| 8,419,022 | B2 * | 4/2013 | Blondelet | B60G 7/006 280/5.52 |
| 8,534,433 | B2 * | 9/2013 | Kramer | B60G 7/003 188/266.6 |
| 2002/0113393 | A1 * | 8/2002 | Urbach | B60G 17/0162 280/124.106 |
| 2004/0173985 | A1 | 9/2004 | Bruhl et al. | |
| 2010/0244340 | A1 * | 9/2010 | Wootten | B60G 15/12 267/64.15 |
| 2010/0289229 | A1 | 11/2010 | Post, II et al. | |

FOREIGN PATENT DOCUMENTS

| | | |
|---|---|---|
| CN | 2502930 Y | 7/2002 |
| DE | 69622141 T2 | 11/2002 |
| DE | 102012006928 A1 | 11/2012 |
| EP | 2251217 A1 | 11/2010 |

* cited by examiner

ELASTIC CHASSIS LINK FOR A VEHICLE

CROSS-REFERENCE TO RELATED APPLICATIONS

This application is the U.S. National Phase of PCT/DE2016/200274 filed Jun. 15, 2016, which claims priority to DE 102015214460.7 filed Jul. 30, 2015, the entire disclosures of which are incorporated by reference herein.

TECHNICAL FIELD

This disclosure relates to an elastic chassis link for a vehicle, comprising a sliding joint having a first and a second sliding joint rod, wherein the two sliding joint rods can move axially in relation to one another in order to modify the rigidity of the elastic chassis link.

BACKGROUND

Rubber bearings are normally used in the chassis of a vehicle in the suspension for the connection between a chassis link and the axle mount at one end, and between the chassis link and the wheel mount at the other end. The design of these rubber bearings is always a compromise between rigid rubber bearings for a sporty, precise driving performance, and soft rubber bearings for a comfortable driving performance. The rigidity of the chassis link cannot be adjusted.

From the prior art known in general, different rubber bearings are known for use in the chassis area of a vehicle. On one hand, purely mechanical rubber bearings are known, having a defined rigidity. Moreover, hydraulically dampened rubber bearings having a fixed or variable rigidity are known. Furthermore, rubber bearings with magnetorheological fluids or magnetorheological elastomers are known, wherein the rigidity can be varied via a magnetic field.

By way of example, DE 696 22 141 T2 discloses a method for the production and use of a suspension bushing having variable rigidity for controlling the relative movement between a chassis link in a motor vehicle and a frame component of the motor vehicle. The suspension bushing has a variable rigidity, which is implemented in that a magnetorheological elastomer or gel is embedded therein, the rigidity of which can be adjusted in a variable manner over a broad range, this being by means of a variable magnetic field. The variable magnetic field is generated by means of an electromagnetic structure, which is entirely integrated in a suspension bushing structure as part of the electromagnetic structure.

The object of various embodiments of the invention described herein is to create an elastic chassis link for a vehicle, the rigidity of which is adjustable

SUMMARY

In accordance with this disclosure, the first sliding joint rod is connected to a piston, wherein the piston is disposed on the second sliding joint rod, substantially in the center of a piston chamber, but able to move axially therein, wherein furthermore, the piston divides the piston chamber into two chambers, and interacts with at least one damping element disposed in the respective chamber in order to dampen vibrations. The piston thus has two piston surfaces. In particular, the second sliding joint rod is designed as a hollow shaft, intended for receiving the first sliding joint rod. Consequently, the first sliding joint rod is at least partially disposed inside the second sliding joint rod. The substantially central placement of the piston is to be understood to mean that the piston is disposed in the center in a starting position, but can be axially displaced when the elastic chassis link is subjected to a force. Consequently, the axial displacement of the piston in the piston chamber dampens vibrations.

According to an exemplary embodiment, the at least one damping element is a non-compressible liquid, which circulates via at least one fluid line between the two chambers when the piston is displaced axially. In particular, the non-compressible liquid is an oil. Consequently, the at least one damping element is configured as a hydraulic damper.

The at least one fluid line has an adjustable valve element for regulating the fluid circulation. The valve element may be configured as a modifiable choke valve. Furthermore, the at least one fluid line is formed in the second sliding joint rod.

Furthermore, the at least one fluid line in the piston may be configured, and interacts with an adjustable aperture, to regulate the fluid circulation. In particular, numerous axial fluid lines are formed in the piston, in order to obtain a high flow-through rate when the aperture is open.

The adjustable aperture can particularly preferably be controlled by an actuator. For this, the aperture is functionally connected to the actuator via a switching element, wherein the actuator rotates the aperture via the switching element, thus modifying the cross section of the at least one fluid line in the piston.

Advantageously, the piston can be returned to a starting position in the piston chamber via two compression springs acting, at least indirectly, axially thereon. The two compression springs act axially on the piston in opposite directions, at least indirectly. In particular, the piston is connected to the first sliding joint rod via a connecting rod, such that the spring force is applied indirectly to the piston via the connecting rod.

In particular, the two compression springs come to bear, at least indirectly, axially between the two sliding joint rods. The first compression spring preferably bears axially between a distal end of the first sliding joint rod and a first radially formed web on the second sliding joint rod. The second compression spring also preferably bears axially between a bearing element on the connecting rod and a second radial web on the second sliding joint rod. Consequently, the two sliding joint rods are indirectly connected to one another in an elastic manner via the two compression springs.

According to a further exemplary embodiment, at least one elastomer element is disposed in the respective chamber as a damping element, wherein the piston can be axially secured in place, at least indirectly, via a locking device. In other words, the at least one elastomer element replaces the fluid as a damping element. In this manner, a mechanical damper is created.

The locking device may have at least two clamp elements, which are configured to axially secure the piston when they are closed, at least indirectly, and to axially release it when they are open, at least indirectly. Consequently, the two clamp elements form a pair of clamps. In particular, at least three of these pairs of clamps are distributed over the circumference of the second sliding joint rod, and act, preferably directly, on the first sliding joint rod, wherein the first sliding joint rod is connected to the piston via a connecting rod.

This disclosure includes the technical teaching, that the locking device includes a worm gear, which is configured to shift the two clamp elements between the closed position and the open position. The locking device may also comprise an electric motor for the indirect driving of the worm shaft via the worm gear. Consequently, the worm shaft combs in order to shift the two clamp elements with the two clamp elements.

BRIEF DESCRIPTION OF THE DRAWINGS

Further measures improving embodiments of the invention shall be explained in greater detail below, together with the description of preferred exemplary embodiments of the invention, based on the Figures. Therein

DETAILED DESCRIPTION OF THE DRAWINGS

Figure 1:
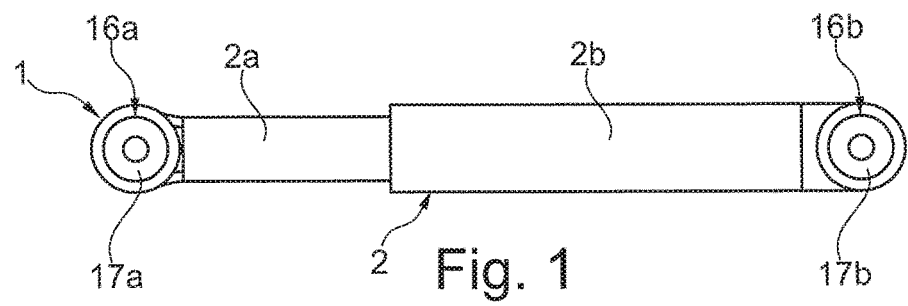
FIG. 1 shows a schematic view of an elastic chassis link for a motor vehicle.

According to FIG. 1, an elastic chassis link 1 according to one embodiment has a sliding joint 2 that has a first and a second sliding joint rod 2a, 2b. The two sliding joint rods 2a, 2b can move axially in relation to one another in order to modify the rigidity of the elastic chassis link 1. In other words, the second sliding joint rod 2b is designed as a hollow shaft, and intended for receiving the first sliding joint rod 2a. In order to attach the elastic chassis link 1 to a wheel mount—not shown here—at one end, and an axle mount—not shown here—at the other end, a relatively rigid rubber bearing 17a, 17b is disposed in a respective bore hole 16a, 16b provided for this. The axial movement of the two sliding joint rods 2a, 2b in relation to one another forms the elasticity of the chassis link 1, such that, instead of the relatively rigid rubber bearings 17a, 17b, a respective ball joint—not shown here—can likewise be used to attach the elastic chassis link 1 to the wheel mount at one end, and to the axle mount at the other end.

Figure 2:
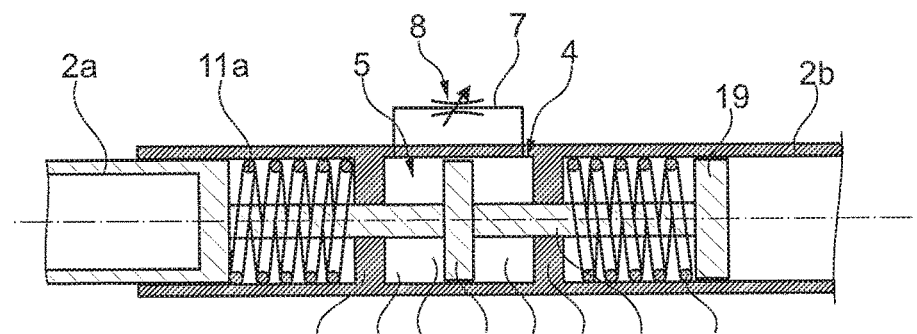
FIG. 2 shows a schematic partial sectional view illustrating the construction of the elastic chassis link according to the invention in accordance with a first exemplary embodiment.
Figure 3:
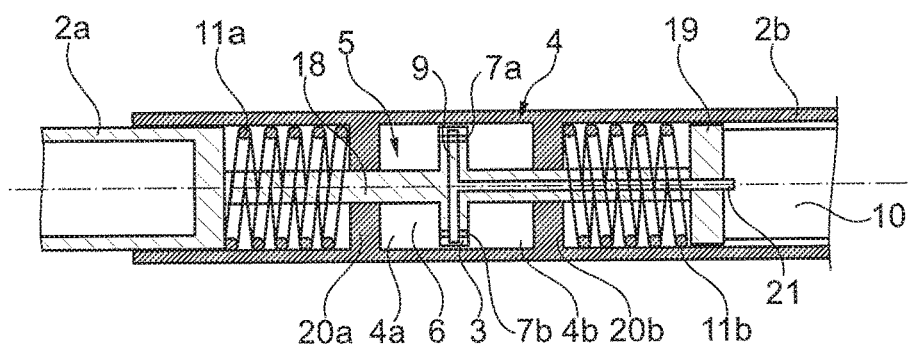
FIG. 3 shows a schematic partial sectional view illustrating the construction of the elastic chassis link according to the invention in accordance with a second exemplary embodiment.

According to FIGS. 2 and 3, the first sliding joint rod 2a is connected to a piston 3 via a connecting rod 18. Furthermore, a bearing element 19 is formed on a distal end of the connecting rod 18. The piston 3 is disposed on the second sliding joint rod 2b, substantially centrally, but able to move axially, in a piston chamber 4. Furthermore, the piston is retained in a substantially central starting position in the piston chamber 4 via two compression springs 11a, 11b, acting axially on the piston 3, at least indirectly. For this, the two compression springs 11a, 11b come to bear axially between the two sliding joint rods 2a, 2b. In particular, the first compression spring 11a is disposed axially between a distal end of the first sliding joint rod 2a and a first web 20a formed on the second sliding joint rod 2b, facing radially inward. In contrast, the second compression spring 11b is disposed axially between the bearing element 19 on the connecting rod 18 and a second web 20b formed on the second sliding joint rod 2b, facing radially inward. The two compression springs 11a, 11b act on the piston 3 in opposite directions thereby, such that the piston 3 can be automatically returned to the starting position through the overlapping forces of the two compression springs 11a, 11b, after it has been deflected from the starting position.

The piston 3 divides the piston chamber 4 into two chambers 4a, 4b, and interacts with a damping element 5 disposed in the two chambers 4a, 4b to dampen vibrations. A non-compressible fluid 6 is provided as the damping element 5 in the respective chambers 4a, 4b.

In accordance with FIG. 2, the two chambers 5a, 5b are connected to one another via a fluid line 7. In order to regulate the fluid circulation, the fluid line 7 has an adjustable valve element 8. The valve element 8 can be adjusted continuously between a fully open setting and a fully closed setting. With an at least partially open setting of the valve element 8, a displacement of the piston in the piston chamber 4 is implemented, wherein the fluid 6 circulates from the one respective chamber 5a, 5b into the other respective chamber 5b, 5a via the fluid line 7. When the valve element 8 is opened further, the fluid 6 circulates more quickly through the fluid line 7, and the rigidity of the elastic chassis link 1 decreases accordingly. Consequently, the rigidity of the elastic chassis link 1 can be adjusted in a variable manner. Furthermore, there is also the possibility of fully closing the valve element 8, thus setting a maximum rigidity of the elastic chassis link 1, wherein the piston 3 can then no longer move axially in the piston chamber 4.

In accordance with FIG. 3, both chambers 4a, 4b are connected to one another via numerous fluid lines 7a, 7b formed in the piston 3, of which only two of the fluid lines 7a, 7b are depicted. In order to regulate the fluid circulation, an adjustable aperture 9 is disposed on the piston 3, wherein the aperture 9 is intended for adjusting the cross section area of the respective fluid line 7a, 7b in a continuous manner between a fully open setting and a fully closed setting. For this, the aperture 9 can be controlled by an actuator 10 disposed axially in the bearing element 19. Furthermore, a shift element 21 of the actuator 10 runs axially through the connecting rod 18, wherein the shift element 21 is provided for rotating the aperture 9, and thus adjusting the cross section area of the respective fluid line 7a, 7b. When the cross section area of the respective fluid line 7a, 7b is larger, the fluid 6 circulates more quickly through the respective fluid line 7a, 7b, and the rigidity of the elastic chassis link 1 is reduced accordingly. A maximum rigidity of the elastic chassis link 1 is implemented through a complete closing of the respective fluid line 7a, 7b, wherein the piston 3 then can no longer move axially in the piston chamber 4.

Figure 4:
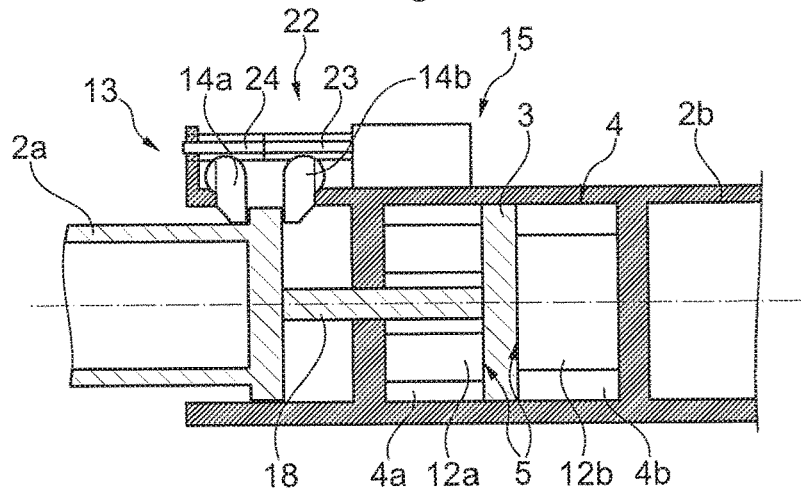
FIG. 4 shows a schematic partial sectional view illustrating the construction of the elastic chassis link according to the invention in accordance with a third exemplary embodiment.

In accordance with FIG. 4, the first sliding joint rod 2a is connected to the piston 3 via the connecting rod 18. The piston 3 is disposed on the second sliding rod joint 2b, substantially centrally in the piston chamber 4, but able to move axially therein. The piston 3 divides the piston chamber 4 into two chambers 4a, 4b thereby, and interacts with an elastomer element 12a, 12b disposed in one of the two respective chambers 4a, 4b in order to dampen vibrations. An annular elastomer element 12a is disposed in the first chamber 4a, and a cylindrical elastomer element 12b is disposed in the second chamber 4b. The two elastomer elements 12a, 12b act on the piston 3 in opposite directions, such that the piston 3 can be automatically returned to the starting position through the overlapping forces of the two elastomer elements 12a, 12b, after it has been deflected from the starting position. Furthermore, a locking device 13 is disposed on the second sliding joint rod 2b, which has two clamp elements 14a, 14b, wherein the clamp elements 14a, 14b are configured to axially secure the piston 3 in place, at least indirectly, when they are closed, and to release it when they are open. The locking device 13 comprises a worm gear 15, which is configured to shift the clamp elements 14a, 14b between the closed position and the open position.

The worm gear 15 has a worm shaft 22, wherein a left-hand thread 23 and a right-hand thread 24 are formed on the worm shaft 22. As a result, when the worm shaft 22 is rotated in a first direction, an opening of the two clamp elements 14a, 14b takes place, thus axially releasing the piston 3. In contrast, when the worm shaft 22 is rotated in a second direction, a clamping of the two clamp elements 14a, 14b takes place, thus axially locking the piston 3 in place. Thus, when the clamp elements 14a, 14b are closed, a high rigidity of the chassis link 1 is obtained. In contrast, when the clamp elements 14a, 14b are open, a lower rigidity of the chassis link 1 is obtained, due to the possibility of an axial displacement of the piston 3 in the piston chamber 4.

LIST OF REFERENCE SYMBOLS

1 chassis link
2 sliding joint
2a, 2b sliding joint rods
3 piston
4 piston chamber
4a, 4b chambers
5 damping element
6 fluid
7, 7a, 7b fluid lines
8 valve element
9 aperture
10 actuator
11a, 11b compression springs
12a, 12b elastomer element
13 locking device
14a, 14b clamp elements
15 worm gear
16a, 16b bore hole
17a, 17b rubber bearing
18 connecting rod
19 bearing element
20a, 20b web
21 switching element
22 worm shaft
23 left-hand thread
24 right-hand thread

The invention claimed is:

1. An elastic chassis link for a vehicle, comprising:
a sliding joint having a first and a second sliding joint rod, wherein the sliding joint rods can move axially in relation to one another in order to modify a rigidity of the elastic chassis link, wherein the first sliding joint rod is connected to a piston that is disposed on the second sliding joint rod and substantially centrally in a piston chamber but able to move axially within the piston chamber, wherein the piston divides the piston chamber into two chambers and interacts with at least one damping element in the two chambers to dampen vibrations, and wherein the second sliding joint rod includes a pair of webs extending radially inwardly on either axial boundary of the piston chamber, wherein one of the webs axially separates an axial end of the first sliding joint rod from the piston chamber.

2. The elastic chassis link of claim 1, wherein the at least one damping element is a non-compressible fluid which circulates between the two chambers via at least one fluid line when the piston is displaced axially.

3. The elastic chassis link of claim 2, wherein the at least one fluid line has an adjustable valve element for regulating the fluid circulation.

4. The elastic chassis link of claim 2, wherein the at least one fluid line is formed in the piston and interacts with an adjustable aperture in order to regulate the fluid circulation.

5. The elastic chassis link of claim 4, wherein the adjustable aperture can be controlled by an actuator.

6. The elastic chassis link of claim 2, wherein the piston can be returned to a starting position in the piston chamber via two compression springs acting axially, at least indirectly, thereon, wherein each compression spring contacts a respective one of the webs, and one of the springs contacts the first sliding joint.

7. The elastic chassis link of claim 6, wherein the two compression springs bear axially, at least indirectly, between the two sliding joint rods.

8. An adjustable chassis link for a vehicle, the adjustable chassis link comprising:
a first sliding joint rod extending along an axis;
a second sliding joint rod extending along the axis and having an interior that receives the first sliding joint rod, the second sliding joint rod having a first web extending radially inwardly and a second web extending radially inwardly, wherein the first sliding joint rod is axially moveable within a chamber of and the second sliding joint rod, and wherein the chamber is axially bound between the first sliding joint rod and the first web;
a piston chamber within the second sliding joint rod axially between the first and second webs;
a piston disposed in the piston chamber and connected to at least one of the first and second sliding joint rods; and
a damping element disposed in the piston chamber and configured to dampen vibrations of the adjustable chassis link.

9. The adjustable chassis link of claim 8, wherein the damping element is adjustable such that a magnitude of damping provided by the damping element is adjustable.

10. The adjustable chassis link of claim 9, wherein the damping element is a non-compressible fluid.

11. The adjustable chassis link of claim 10, wherein the piston chamber includes two chamber sections connected via a fluid line, wherein movement of the piston within the chamber causes the non-compressible fluid to transfer from one of the chamber sections to the other of the chamber sections.

12. The adjustable chassis link of claim 11, wherein the fluid line includes an adjustable valve configured to regulate flow of the non-compressible fluid through the fluid line to thereby adjust the magnitude of damping provided by the damping element.

13. The adjustable chassis link of claim 8, wherein the first sliding joint rod extends between a first axial end disposed outside the second sliding joint rod, and a second axial end disposed inside the second sliding joint rod,
wherein the first web is axially aligned with the second axial end, and axially separates the second axial end from the piston chamber.

14. The adjustable chassis link of claim 8, further comprising a spring in the chamber between the first sliding joint rod and the first web.

15. A vehicle chassis link comprising:
a first sliding joint rod extending along an axis; and
a second sliding joint rod extending along the axis and moveable along the axis relative to the first sliding joint rod, wherein one of the first or second sliding joint rods includes a pair of webs extending radially inward therefrom;

a piston chamber within at least one of the first and second sliding joints and axially bound by the pair of webs; and a piston disposed in the piston chamber and separating the piston chamber into a first fluid chamber and a second fluid chamber;

wherein fluid transfers between the first and second fluid chambers as the piston moves within the piston chamber to modify a damping characteristic of the chassis link.

16. The vehicle chassis link of claim 15, wherein the first and second fluid chambers are fluidly connected via a fluid line extending radially outward from the first and second sliding joint rods.

17. The vehicle chassis link of claim 15, wherein the first and second fluid chambers are fluidly connected via a fluid line extending through the piston.

18. The vehicle chassis link of claim 15, further comprising a fluid line fluidly coupling the first and second fluid chambers, and an adjustable valve configured to regulate the flow of the fluid through the fluid line to modify the damping characteristic of the chassis link.

19. The vehicle chassis link of claim 15, wherein a chamber is defined axially between one of the webs and the first sliding joint.

20. The vehicle chassis link of claim 19, further comprising a spring in the chamber contacting the first sliding joint rod and the one of the webs.

\* \* \* \* \*